United States Patent
Miura

(10) Patent No.: US 7,628,241 B2
(45) Date of Patent: Dec. 8, 2009

(54) TURNING CONTROL APPARATUS FOR VEHICLE

(75) Inventor: Takami Miura, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 246 days.

(21) Appl. No.: 11/712,522

(22) Filed: Mar. 1, 2007

(65) Prior Publication Data

US 2007/0239340 A1 Oct. 11, 2007

(30) Foreign Application Priority Data

Mar. 24, 2006 (JP) .............................. 2006-083692

(51) Int. Cl.
*B60K 17/346* (2006.01)
*B60K 28/16* (2006.01)

(52) U.S. Cl. .......................... 180/248; 180/197; 701/69

(58) Field of Classification Search ................ 180/197, 180/233, 248, 249; 701/69, 70, 88, 89
See application file for complete search history.

(56) References Cited

U.S. PATENT DOCUMENTS

| 4,790,404 | A | | 12/1988 | Naito | |
|---|---|---|---|---|---|
| 4,844,557 | A | | 7/1989 | Giers | |
| 4,953,657 | A | * | 9/1990 | Edington | ..................... 181/111 |
| 5,075,854 | A | * | 12/1991 | Imaseki et al. | .................. 701/36 |
| 5,168,953 | A | * | 12/1992 | Naito | ........................ 180/197 |
| 5,183,131 | A | * | 2/1993 | Naito | ........................ 180/233 |
| 5,407,023 | A | * | 4/1995 | Yamashita et al. | ........... 180/197 |
| 5,597,215 | A | | 1/1997 | Fischle et al. | |
| 6,487,486 | B1 | * | 11/2002 | Anderson | ..................... 701/69 |
| 2007/0222286 | A1 | * | 9/2007 | Miura | ........................ 303/140 |

FOREIGN PATENT DOCUMENTS

| DE | 37 08 063 C2 | 1/1992 |
|---|---|---|
| DE | 44 18 773 C1 | 1/1996 |
| EP | 0 293 561 A2 | 12/1988 |
| JP | 7-108842 A | 4/1995 |

* cited by examiner

*Primary Examiner*—Lesley D. Morris
*Assistant Examiner*—Marc A Scharich
(74) *Attorney, Agent, or Firm*—Birch, Stewart, Kolasch & Birch, LLP

(57) ABSTRACT

A turning control apparatus for a vehicle with improved turning ability and that avoids degradation of acceleration ability is provided.

The turning control apparatus comprises: a driving torque controller (31) for adjusting driving torque between a left and right wheels (14L and 14R); a unit(41) for setting a basic-driving-torque-difference value indicating a difference of the driving torque between the left and right wheels (14L and 14R); a unit (42) for obtaining an acceleration/deceleration value indicating a degree of acceleration/deceleration of the vehicle; and a unit (43) for adjusting the basic-driving-torque-difference value, as a target driving torque difference, according to the acceleration/deceleration value and the velocity of the vehicle sensed.

The driving torque controller (31) adjusts the driving torque between the left and right wheels (14L and 14R) according to the target driving torque obtained by the basic-driving-torque-difference value adjusting unit (43).

8 Claims, 5 Drawing Sheets

TURNING CONTROL APPARATUS FOR VEHICLE

BACKGROUND OF THE INVENTION (1) Field of the Invention

The present invention relates to a turning control apparatus for a vehicle.

(2) Description of Related Art

Techniques have been developed for improving safety of vehicles by achieving vehicle-stability during turning maneuvers.

For example, the following related document 1 discloses estimating generation of TACK-IN (rapid turning of a vehicle) in response to releasing the accelerator pedal, according to the angle and operation speed of accelerator pedal, and further estimating degree of TACK-IN according to a basic-lateral-acceleration value calculated based on angle of the steering wheel and velocity of the vehicle.

Document 1 also discloses such a technique of controlling the vehicle so as to prevent TACK-IN from happening and to enhance vehicular stability during turning.

[Related Document 1] Japanese Patent Publication 3116686

However, even when the angle and operation speed of the accelerator pedal is slightly varied, it is difficult to precisely execute control to prevent TACK-IN using the technique of related document 1 due to selectively estimating whether TACK-IN is happening or not.

In other words, it is difficult for the driver of a vehicle to anticipate the motion of the vehicle because the control for avoiding TACK-IN works on and off even if the accelerator pedal is not moved significantly. Accordingly, it is difficult to operate the vehicle stably.

SUMMARY OF THE INVENTION

The present invention has been developed in consideration of this situation, and it is therefore an object of the invention to provide a turning control apparatus for a vehicle, which apparatus is capable of improving both turning ability and operatability of the vehicle.

For this purpose, in accordance with an aspect of the present invention, there is provided a turning control apparatus for a vehicle comprising: a driving torque controller (31) for adjusting driving torque between a left wheel (14L) and a right wheel (14R); means for detecting a state of turning of the vehicle; means for sensing a velocity of the vehicle; means (41) for setting a basic-driving-torque-difference value indicating a difference of the driving torque between the left wheel (14L) and the right wheel (14R); means (42) for obtaining an acceleration/deceleration value indicating a degree of acceleration or deceleration of the vehicle; and means (43) for adjusting the basic-driving-torque-difference value, as a target driving torque difference, according to the acceleration/deceleration value obtained by said acceleration/deceleration value obtaining means and the velocity of the vehicle sensed by said vehicle velocity sensing means, said driving torque controller (31) adjusting the driving torque between the left wheel (14L) and the right wheel (14R) according to the target driving torque obtained by said basic-driving-torque-difference value adjusting means (43).

According to the present invention, it is possible to improve turning ability and operatability of the vehicle owing to driving torque adjustment between a left wheel and a right wheel based on state of turning of the vehicle, further based on an acceleration/deceleration value, which indicates degree of acceleration or deceleration of the vehicle, and velocity of the vehicle.

It is also possible to improve the stability and maintain the acceleration ability because each of the driving torque of the left wheel and the right wheel are adjusted more than when the vehicle is accelerating.

Further, it is possible to effectively avoid occurrence of under-steering owing to adjustment of each the driving torque of the left wheel and the right wheel in response to increments in acceleration indicated by the acceleration/deceleration value.

Still further, it is possible to effectively avoid occurrence of over-steering (TACK-IN) owing to adjustment of the driving torque of the left wheel and the right wheel so as to prevent turning of the vehicle in response to increments in deceleration indicated by the acceleration/deceleration value.

When the vehicle runs at relatively high speed and decelerates, it is difficult for the driver to control the vehicle due to the easy occurrence of excess TACK-IN.

Even in such cases, according to the present invention, it is possible to avoid the occurrence of excess TACK-IN by increasing the degree of adjustment of the driving torque for the left wheel and the right wheel relative to the vehicle's velocity.

It is also possible to give high priority to improving the vehicular stability to make the vehicle run straight due to the decreased degree of adjusted the driving torque being transmitted to the left wheel and the right wheel in response to increments in the velocity when the vehicle is accelerated.

Still further, it is possible to smoothly vary the driving torque of the left wheel and the right wheel relative to the acceleration or deceleration which is sensed precisely and seamlessly, and with a quick response owing to the acceleration/deceleration value based on the output torque of the engine being obtained.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

The embodiment of present invention will now be described with reference to the accompanying drawings.

Figure 1:
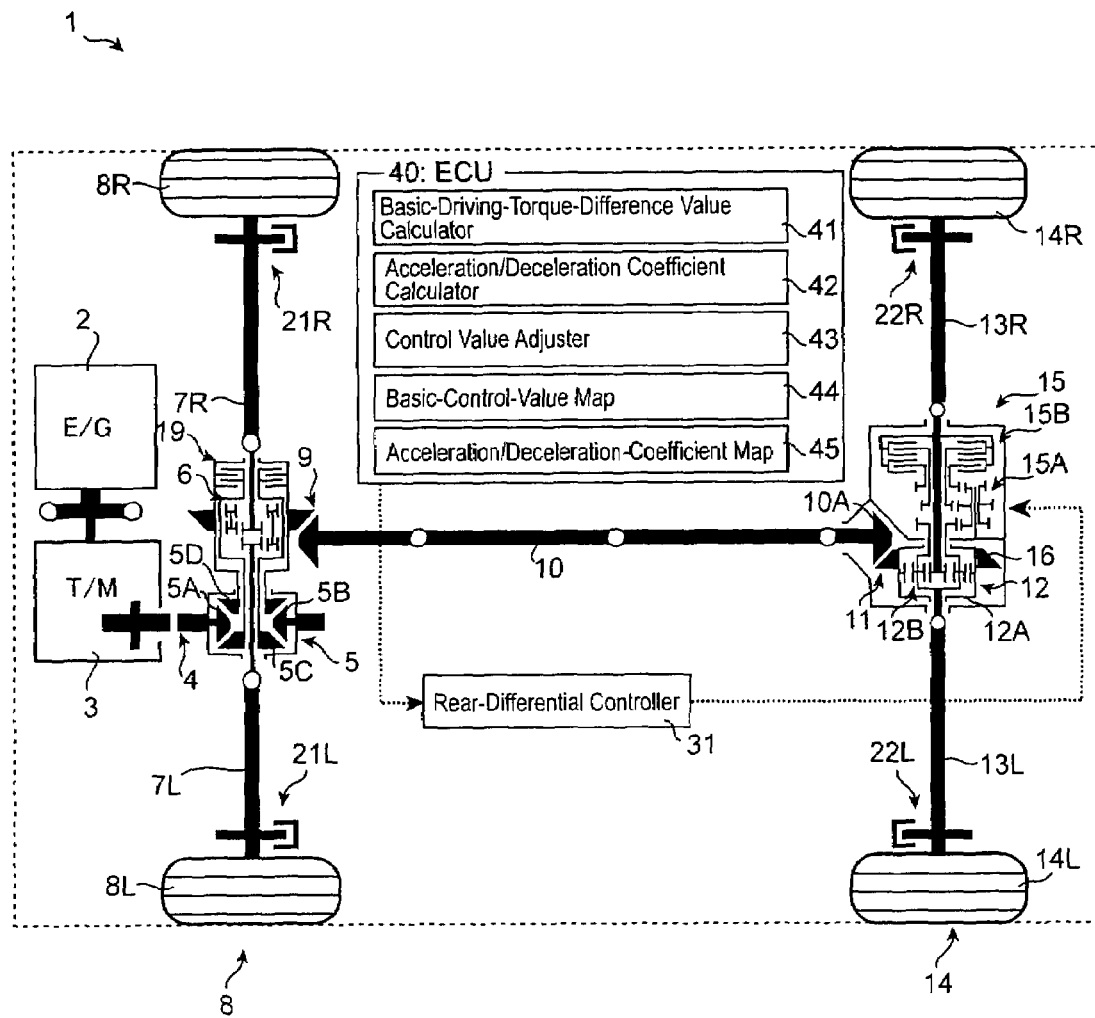
FIG. 1 is a block diagram schematically showing the entire organization of an embodiment of the present invention.

As shown in FIG. 1, an engine 2 is mounted on a vehicle 1. The torque output from the engine 2 is transmitted to a center differential 5 via transmission 3 and intermediate gear mechanism 4. The center differential 5 has a front-rear wheels limiting mechanism 19 which will be described later.

The output torque from the center differential 5 is individually transmitted to a front-right wheel 8R and a front-left wheel 8L via a front differential 6 and each of shafts 7L and 7R. The torque output from the differential 5 is individually transmitted to a rear-right wheel 14R and rear-left wheel 14L via a front-hypoid gear mechanism 9, a propeller shaft 10, a rear-hypoid gear mechanism 11, a rear-differential 12 and each of shafts 13R and 13L. The rear-differential 12 has a right-left wheel limiting mechanism 15 which will be described later.

The front-differential 6, so-called torque-sensing type of differential, can limit the difference in speed mechanically between the right and left wheels 8R and 8L corresponding to the torque input from the engine 2.

The center differential 5 has differential pinions 5A and 5B, and side gears 5C and 5D engaging with the pinions 5A and 5B, respectively. The torque input from the differential pinions 5A and 5B is transmitted to rear wheels 14. Further, the center differential 5 permits rotation of the front wheels 8 at a different speed from the rear wheels 14, and accordingly, the turning ability of turning of the vehicle is secured.

The center differential 5 also has the front-rear wheel limiting mechanism 19 which can vary the degree of limitation of the speed differences between the front wheels 8 and the rear wheels 14, and can variably distribute the output torque from the engine 2 to each of the front wheels 8 and the rear wheels 14.

The front-rear wheel limiting mechanism 19 is a hydraulic multiple disk clutch that can vary the degree of limitation of speed differences between the front wheels 8 and the rear wheels 14 in response to varied oil pressure input from a driving oil pressure unit (not shown). Thus, the distributed torque is variably input to each of the front wheels 8 and rear wheels 14.

The oil pressure output from the driving oil pressure unit to the front-rear wheel limiting mechanism 19, being controlled by a center-differential controller 32, is described later.

As stated above, according to the front-rear wheel limiting mechanism 19, it is possible to improve the traction of the vehicle 1 by limiting the different speeds between the front wheels 8 and the rear wheels 14, and it is also possible to improve the turning ability of the vehicle 1 by not limiting the speed difference between the front wheels 8 and the rear wheels 14.

Next the driving system for the rear wheels 14 will be described.

Each of the rear wheels 14R and 14L are connected to the rear-differential 12 including the right-left wheel limiting mechanism 15 for varying the difference of driving torque transmitted to each of the rear wheels 14R and 14L.

The rear-differential 12 has a case 12A. A crown gear 16 is formed around the case 12A, and a planetary gear mechanism 12B is equipped in the case 12A. The planetary gear mechanism 12B is for permitting the difference of speed between each of rear wheels 14R and 14L.

Namely, the planetary gear mechanism 12B enables transmission to the driving torque, which is input from the engine 2 to the crown gear 16 via the propeller shaft 10 and a pinion gear 10A, to each of the rear wheels 14R and 14L while not limiting the different speeds between the rear-right wheel 14R and the rear-left wheel 14L.

The right-left wheel limiting mechanism 15 includes a speed-varying mechanism 15A and a torque-transmitting mechanism 15B which can vary the output torque thereof.

The right-left wheel limiting mechanism 15 is for varying, based on the signals from an ECU (Electronic Control Unit) 40, the difference of torque between the right wheel 14R and the left wheel 14L corresponding to the driving conditions of the vehicle 1.

The speed-varying mechanism 15A varies the speed of rotation of rear left wheel 14L and outputs the torque to the torque-transmitting mechanism 15B.

The torque-transmitting mechanism 15B is a wet multiple-disk clutch which enables adjustment of the output torque based on the oil pressure input from the driving oil pressure unit.

As stated above, it is possible to vary individually the torque distributed to each of wheels 14R and 14L, using a technique that varies speed of the rear-right wheel 14R with the speed-varying mechanism 15A and which adjusts the output torque using the torque-transmitting mechanism 15B. Hence the driving torque input to one of wheels 14R and 14L is increased or decreased by decreasing or increasing the other driving torque.

The planetary gear mechanism 12B, the speed-varying mechanism 15A and the torque-transmitting mechanism 15B are already known, therefore, description of these techniques is omitted in this embodiment.

The oil pressure input from the driving oil pressure unit to the right-left wheel limiting mechanism 15 is controlled by a rear-differential controller 31. The rear-differential controller 31 and control thereof will be described later.

For example, in a case where the vehicle 1 moves forward and turns right, the oil pressure is input from the driving oil pressure unit (not shown) to the right-left wheel limiting mechanism 15, then the torque transmitted to the rear-right wheel 14R is decreased, and the speed of the rear-right wheel 14R is reduced. Accordingly, the torque and speed of the rear-left wheel 14L is increased. Thereby, it is possible to generate yaw momentum of the vehicle 1 in a clockwise direction.

The driving oil pressure unit (not shown) includes not-shown elements: an accumulator, a motor pump for compressing the oil in the accumulator, and a pressure sensor for sensing the oil pressure resulting from compression by the motor pump. The driving oil pressure unit further includes a solenoid-controlled valve for adjusting the oil pressure in the accumulator generated by the motor pump and a pressure-direction valve for selectively supplying the oil pressure from an oil chamber (not shown) in the right-left wheel limiting mechanism 15 or another oil chamber (not shown) in the front-rear wheel limiting mechanism 19.

The rear-differential controller 31 is an electrical control unit including a not-shown interface, memories and a CPU. The rear-differential controller 31 is for adjusting individual driving torque of the rear wheels 14R and 14L through the oil pressure unit in such a manner that the controller 31 sends a torque distribution signal to the driving oil pressure unit, which signal indicates the amount of oil pressure corresponding to the difference of driving torque between the rear wheels 14R and 14L, and the destination of the oil pressure, and then the controller 31 actuates the oil pressure unit to control the oil pressure supply to the right-left wheel limiting mechanism 15.

The center-differential controller is an electrical control unit including not-shown an interface, memories and a CPU. The center-differential controller transmits a front-rear wheels difference limiting signal, which is a signal corresponding to a target different speed between the front wheels 8 and the rear wheels 14, to the driving oil pressure unit so that the center-differential controller controls the degree of limitation for the differing speeds between the front wheels 8 and the rear wheels 14. The driving oil pressure unit varies the oil pressure input to the front-rear wheel limiting mechanism 19 at the center differential 5.

Each of wheels 8R, 8L, 14R and 14L are equipped with brakes 21R, 21L, 22R and 22L, individually. The brakes 21R, 21L, 22R and 22L are connected to a brake oil pressure unit (not shown) individually supplying oil pressure to the brakes 21R, 21L, 22R and 22L.

Further, the vehicle 1 is equipped with a brake controller (not shown). The brake controller is an electrical control unit including a not-shown interface, memories and a CPU.

The brake controller transmits a brake pressure signal, which is a signal corresponding to a target brake oil pressure to be increased or decreased at the individual brakes 21R, 21L, 22R and 22L, to the brake oil pressure unit so that the brake oil pressure unit varies the oil pressure input to each of the brakes 21R, 21L, 22R and 22L.

The brake oil pressure unit includes a motor pump and solenoid-controlled valves for a brake oil pressure system, and the unit inputs the oil pressure to the individual brakes 21R, 21L, 22R and 22L in response to orders from the brake controller.

As described above, each of the rear-differential controller (driving torque controller) 31, the center-differential controller and the brake controller are individually controlled by the ECU 40.

The ECU 40 is an electrical control unit including a not-shown interface, memories and a CPU, to which are input the results of sensing by not-shown wheel speed sensors, a steering angle sensor (turning state detecting means), a G sensor, a yaw-rate sensor and a vehicular velocity sensor (vehicular velocity sensing means).

The ECU 40 also includes such program files stored in the memory (not shown) as a basic-driving-torque-difference value calculator (driving-torque-difference value setting means) 41, an acceleration/deceleration coefficient calculator (acceleration/deceleration value obtaining means) 42 and a control value adjuster (basic-driving-torque-difference value adjusting means) 43. Also, in the memory, a basic-control-value map 44 and an acceleration/deceleration-coefficient map 45 are stored. The basic-control-value map 44 is utilized by the basic-driving-torque-difference value calculator 41. The acceleration/deceleration-coefficient map 45 is utilized by the acceleration/deceleration coefficient calculator 42.

The basic-driving-torque-difference value calculator 41 calculates a basic value indicating difference of the driving torque (basic torque difference) from the engine 2 between the left wheel 14L and the right wheel 14R based on the steering angle $d_{sw}$ sensed by the steering angle sensor and the vehicle's velocity $v_B$ sensed by the vehicular velocity sensor.

Figure 2:
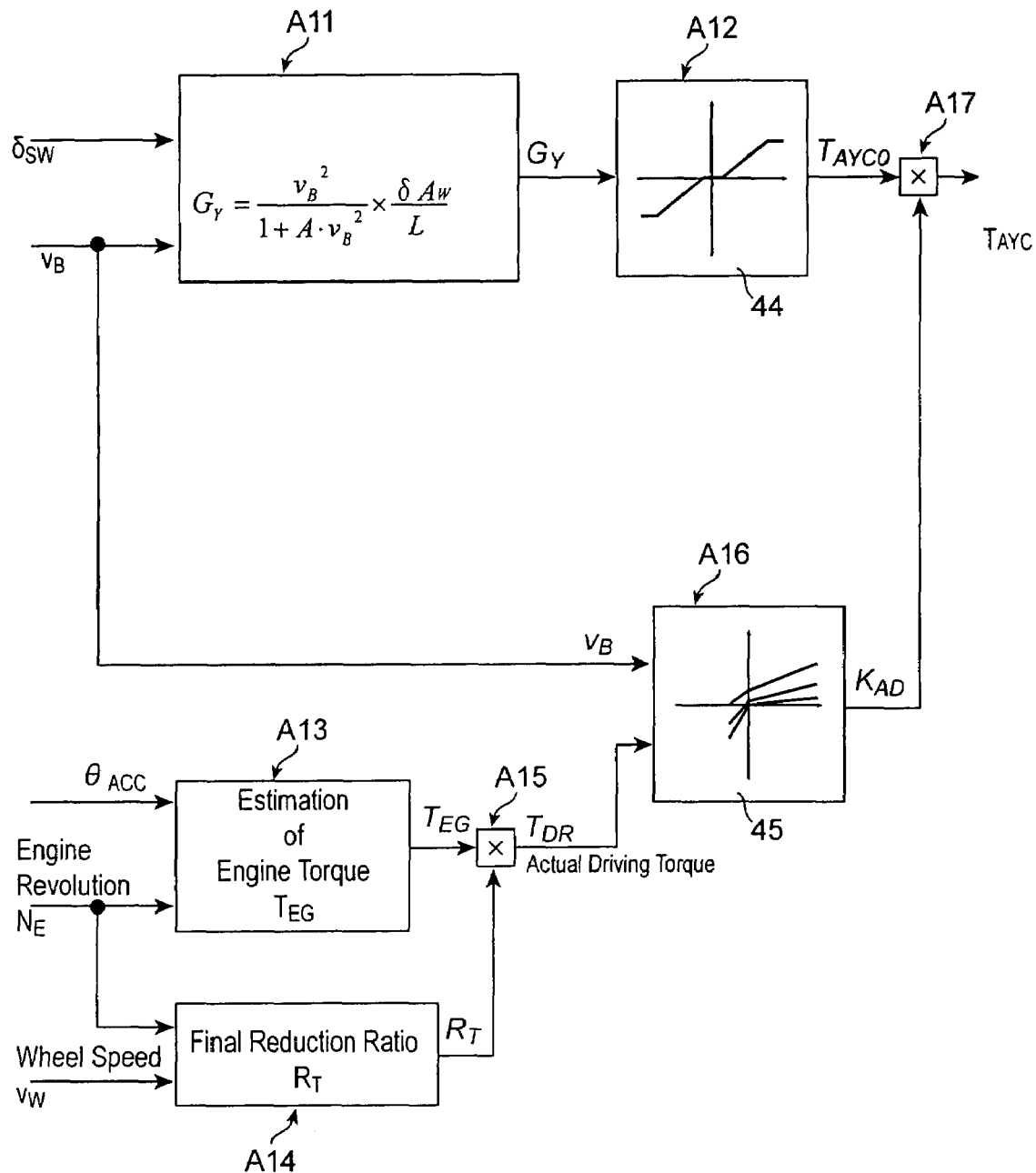
FIG. 2 is a block diagram schematically showing a manner of control in the embodiment of the present invention.
Figure 3:
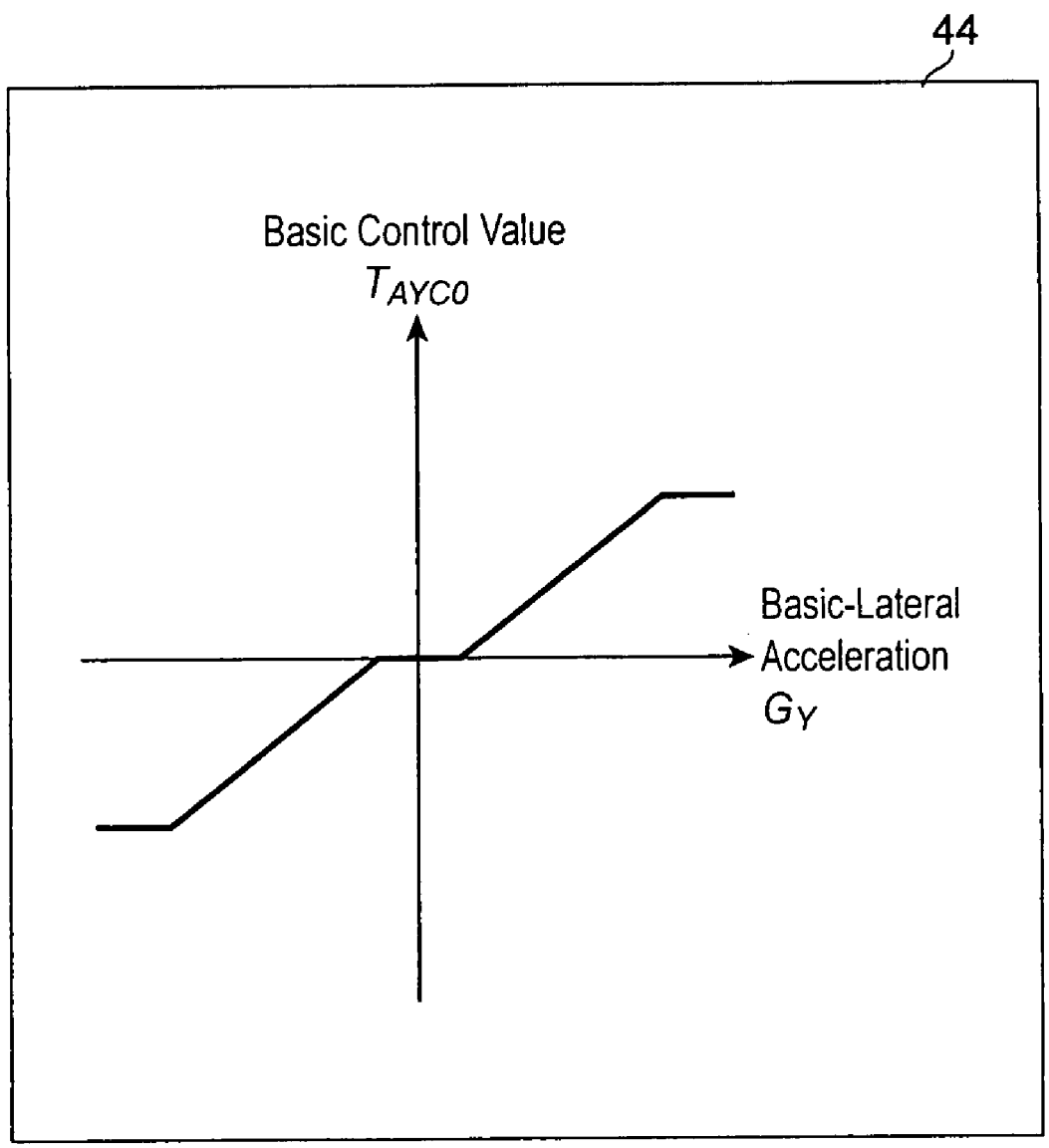
FIG. 3 is a basic-control-value map utilized for obtaining a basic-control value in the embodiment of the present invention.

As shown by arrow A11 in FIG. 2, the basic-driving-torque-difference value calculator 41 calculates basic-lateral acceleration $G_Y$ based on the steering angle $d_{sw}$ and the vehicle's velocity $v_B$. The basic-lateral acceleration $G_Y$ is obtained by following formula (1).

$$G_Y = \frac{v_B^2}{1+A \cdot v_B^2} \times \frac{\delta_{SW}}{L} \tag{1}$$

In the formula (1), "A" stands for stability factor of the vehicle 1 and "L" stands for wheelbase of the vehicle 1.

Then, the basic-driving-torque-difference value calculator 41 obtains a basic control value $T_{AYC0}$ which stands for basic instruction to the rear-differential controller 31 by applying the basic-lateral acceleration $G_Y$ to the basic-control-value map 44 (see arrow A12 in FIG. 2).

On the basic-control-value map 44, the basic-lateral acceleration $G_Y$ is defined as the horizontal axis and the basic control value $T_{AYC0}$ is defined as the vertical axis. On the same basic-control-value map 44, such a relationship is defined that the absolute value of the basic control value $T_{AYC0}$ is increased relative to increments of the absolute value of the basic-lateral acceleration $G_Y$. If the basic-lateral acceleration $G_Y$ is positive ($G_Y>0$), the vehicle 1 turns to the left.

If the basic-lateral acceleration $G_Y$ is negative ($G_Y<0$), the vehicle 1 turns to the right.

Namely, the basic-control-value map 44 is normally set so as to increase yaw momentum of the vehicle 1 according to the increments of the absolute value of basic-lateral acceleration $G_Y$ by instructing the rear-differential controller 31. Note that basic control value $T_{AYC0}$ is adjusted by control value adjuster 43. This point will be described later.

The acceleration/deceleration coefficient calculator 42 calculates acceleration/deceleration coefficient (acceleration/deceleration value) $K_{AD}$ Of the vehicle 1 in the following manner.

First, as shown by arrow A13 in FIG. 2, the acceleration/deceleration coefficient calculator 42 estimates the output torque $T_{EG}$ from the engine 2 based on angle $\theta_{ACC}$ of the accelerator pedal sensed by the accelerator pedal position sensor and revolutions $N_E$ of the engine 2 obtained by crank angle of the engine 2 sensed by a crank angle sensor.

Next, as shown by arrow A14 in FIG. 2, the acceleration/deceleration coefficient calculator 42 estimates a final reduction ratio $R_T$ of the transmission 3 based on the engine revolutions $N_E$, which is an average rotation speed $v_W$ of the wheels 8L, 8R, 14L and 14R sensed by the wheel speed sensors.

Then, the acceleration/deceleration coefficient calculator 42 obtains an actual driving torque $T_{DR}$ (see arrow A15 in FIG. 2) by multiplication of the output torque $T_{EG}$ and the final reduction ratio $R_T$. Finally, the acceleration/deceleration coefficient calculator 42 obtains the acceleration/deceleration coefficient $K_{AD}$ (see arrow A16 as shown in FIG. 2) owing to applying the actual driving torque $T_{DR}$ and the vehicle's velocity $v_B$ to the acceleration/deceleration-coefficient map 45.

Figure 4:
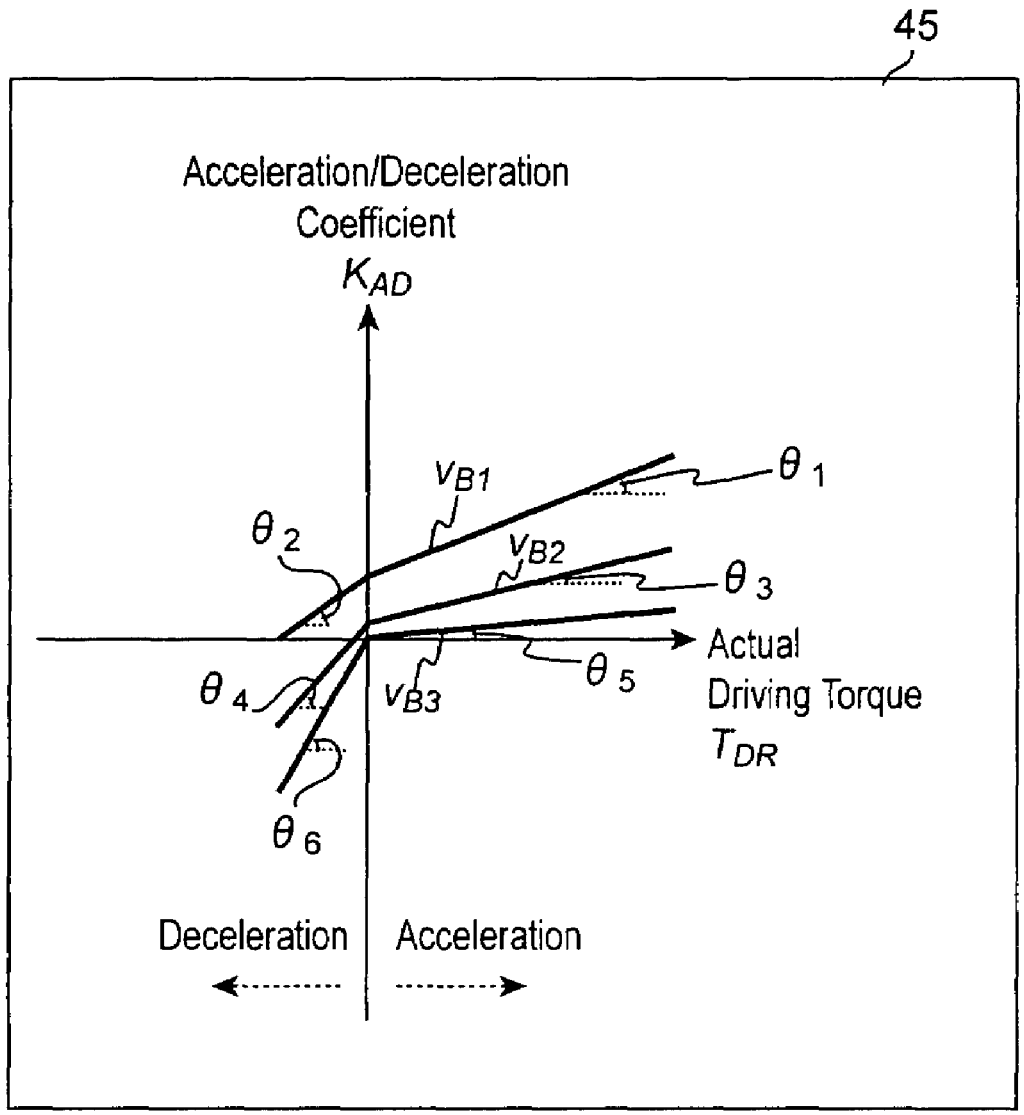
FIG. 4 is an acceleration/deceleration-coefficient map utilized for obtaining an acceleration/deceleration coefficient in the embodiment of the present invention.

As shown in FIG. 4, the acceleration/deceleration-coefficient map 45 is a three-dimensional map defining the relationship between the actual driving torque $T_{DR}$ and the acceleration/deceleration coefficient $K_{AD}$ on the basis of the vehicle's velocity $v_B$. On the map 45, lines $v_{B1}$, $v_{B2}$, and $v_{B3}$ are exemplified. The line $v_{B1}$ shows when the vehicle's velocity $v_B$ is comparatively low, the line $v_{B2}$ shows when the vehicle's velocity $v_B$ is comparatively intermediate, and the line $v_{B3}$ shows when the vehicle's velocity $v_B$ is comparatively high.

On the acceleration/deceleration-coefficient map 45, an area, in which the actual driving torque $T_{DR}$ is positive ($T_{DR}>0$), stands for when the vehicle 1 is accelerated, and another area, in which the actual driving torque $T_{DR}$ is negative ($T_{DR}<0$), stands for when the vehicle 1 is decelerated.

The line $v_{B1}$, showing when the vehicle's velocity $v_B$ is comparatively low, defined in such a manner that it increases in relation to increments of the actual driving torque $T_{DR}$ in the slant $\theta_1$ when the vehicle 1 is accelerated (i.e. within the area in which the actual driving torque $T_{DR}$ is positive ($T_{DR}>0$)). Whereas, when the vehicle 1 is decelerated (i.e. within the area in which the actual driving torque $T_{DR}$ is negative ($T_{DR}<0$)), the line $v_{B1}$ is defined in such a manner that it decreases in relation to decrements of the actual driving torque $T_{DR}$ in the slant $\theta_2$.

The relationship between the slant $\theta_1$ and slant $\theta_2$ is stated as following formula (2).

$$|\theta_1|<|\theta_2| \qquad (2)$$

The line $v_{B2}$, in a case when the vehicle's velocity $v_B$ is comparatively intermediate, is defined in such a manner that it increases in relation to increments of the actual driving torque $T_{DR}$ in the slant $\theta_3$ within the area in which the actual driving torque $T_{DR}$ is positive.

Whereas, within the area in which the actual driving torque $T_{DR}$ is negative, the line $v_{B2}$ is defined in such a manner that it decreases in relation to decrements of the actual driving torque $T_{DR}$ in the slant $\theta_4$.

The relationship between the slant $\theta_3$ and slant $\theta_4$ is stated as following formula (3).

$$|\theta_3|<|\theta_4| \qquad (3)$$

The line $v_{B3}$, in a case where of the vehicle's velocity $v_B$ is comparatively high, is defined in such a manner that it increases in relation to increments of the actual driving torque $T_{DR}$ in the slant $\theta_5$ within the area the actual driving torque $T_{DR}$ is positive. Whereas, within the area in which the actual driving torque $T_{DR}$ is negative, the line $v_{B3}$ is set so as it decreases according to decrements of the actual driving torque $T_{DR}$ in the slant $\theta_6$.

The relationship between the slant $\theta_5$ and slant $\theta_6$ is stated as following formula (4).

$$|\theta_5|<|\theta_6| \qquad (4)$$

As stated above, at any of the lines $v_{B1}$, $v_{B2}$ and $v_{B3}$, when the vehicle 1 is decelerated, the rate of change of the acceleration/deceleration coefficient $K_{AD}$, relative to the actual driving torque $T_{DR}$, is greater than when the vehicle 1 is accelerated. Although, each of the slants $\theta_1$–$\theta_6$ at the lines $v_{B1}$, $v_{B2}$ and $v_{B3}$ is different from each other, all of the acceleration/deceleration coefficient $K_{AD}$ is set to decrease according to delimitation of the actual driving torque $T_{DR}$.

In FIG. 1, the control value adjuster 43 obtains a target control value $T_{AYC}$, which is transmitted to the rear-differential controller 31, owing to adjustment of the basic control value $T_{AYC0}$, which is obtained by basic-driving-torque-difference value calculator 41, according to the acceleration/deceleration coefficient $K_{AD}$ obtained with the acceleration/deceleration-coefficient map 45.

As shown by an arrow A17 in FIG. 2, the control value adjuster 43 obtains the target control value $T_{AYC}$ by multiplication of the basic control value $T_{AYC0}$ and the acceleration/deceleration coefficient $K_{AD}$ and then the adjuster 43 transmits the target control value $T_{AYC}$ to the rear-differential controller 31.

The target control value $T_{AYC}$ indicates the difference between the torque $X_R$ of right-rear wheel 14R and the torque $X_L$ of left-rear wheel 14L ($X_R$–$X_L$)[N·m]. However, it is also possible for the target control value $T_{AYC}$ to indicate torque amounts individually (i.e. the torque right-rear wheel 14R: $X_R$[N·m], the torque left-rear wheel 14L: $X_L$[N·m]). Alternatively, it is possible to modify that the target control value $T_{AYC}$ to individually indicate the torques as a percentage (i.e. the torque left-rear wheel 14L: $Y_L$ [%], the torque right-rear wheel 14R: $Y_R$ [%]).

When the target control value $T_{AYC}$ is positive ($T_{AYC}>0$), the rear-differential controller 31 controls the torque difference between the left-rear wheel 14L and the right-rear wheel 14R so as to prevent left or right turning of the vehicle 1.

Whereas, when the target control value $T_{AYC}$ is negative ($T_{AYC}<0$), the rear-differential controller 31 controls the torque difference between the left-rear wheel 14L and the right-rear wheel 14R so as to promote left or right turning of the vehicle 1.

Consequently, the control value adjuster 43 adjusts the drive torque more when the vehicle 1 is accelerated than when the vehicle 1 is decelerated because the rate of change of the acceleration/deceleration coefficient $K_{AD}$, is defined on the acceleration/deceleration-coefficient map 45 at any of the lines $v_{B1}$, $v_{B2}$ and $v_{B3}$.

When the vehicle 1 is accelerated, the control value adjuster 43 adjusts the driving torque of the left-rear wheel 14L and the right-rear wheel 14R so as to promote turning of the vehicle 1 according to increments of the acceleration/deceleration coefficient $K_{AD}$, whereas when the vehicle 1 is decelerated, the control value adjuster 43 adjusts the driving torque of the left-rear wheel 14L and the right-rear wheel 14R so as to prevent turning according to decrement of the acceleration/deceleration coefficient $K_{AD}$, because, on the acceleration/deceleration-coefficient map 45, the acceleration/deceleration coefficient $K_{AD}$ is set to decrease according to the decrements of the actual driving torque $T_{DR}$, at any of the lines (the vehicle's velocity) $v_{B1}$, $v_{B2}$ and $v_{B3}$.

Focusing on the velocities $v_{B1}$, $v_{B2}$ and $v_{B3}$ individually, when the vehicle 1 is decelerated, the control value adjuster 43 increases the degree of adjusting the driving torque of the left-rear wheel 14L and the right-rear wheel 14R so as to prevent turning of the vehicle 1 according to increments of the vehicle's velocity $v_B$ in any degree of the actual driving torque $T_{DR}$ because, on the acceleration/deceleration-coefficient map 45, the acceleration/deceleration coefficient $K_{AD}$ is set to decrease according to the increments of the vehicle's velocity $v_B$.

Likewise, when the vehicle 1 is accelerated, the control value adjuster 43 decreases the degree of adjusting the driving torque of the left-rear wheel 14L and the right-rear wheel 14R so as to promote turning of the vehicle 1 according to increments of the vehicle's velocity $v_B$ in any degree of the actual driving torque $T_{DR}$ because, on the acceleration/deceleration-coefficient map 45, the acceleration/deceleration coefficient $K_{AD}$ is set to decrease according to the increments of the vehicle's velocity $v_B$.

The operation and effect of the present invention of this embodiment will now be described as follows.

Figure 5:
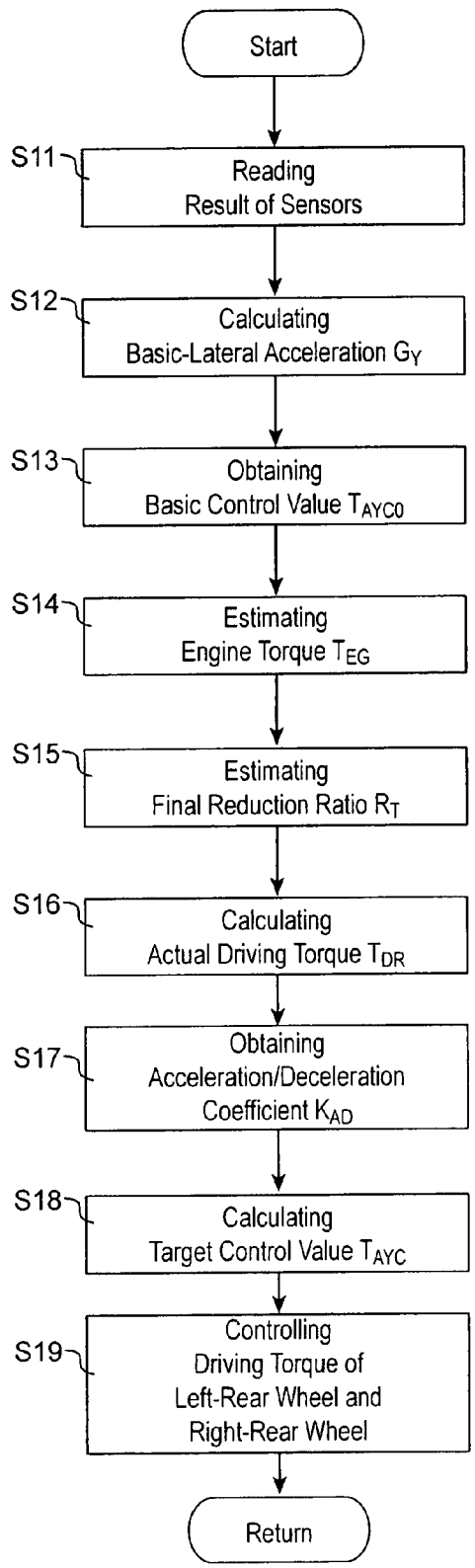
FIG. 5 is a flow chart schematically showing the control in the embodiment of the present invention.

At step S11 in FIG. 5, the basic-driving-torque-difference value calculator 41 reads the result of sensing by the steering angle sensor and the vehicular velocity sensor. The acceleration/deceleration coefficient calculator 42 accordingly reads each result of sensing by the vehicular velocity sensor, the accelerator pedal position sensor, the crank angle sensor and the wheel speed sensors.

Then the basic-driving-torque-difference value calculator 41 calculates the basic-lateral acceleration $G_Y$ based on the steering angle $d_{sw}$ sensed by the steering angle sensor and the vehicle's velocity $v_B$ sensed by vehicular velocity sensor (step S12), and the calculator 41 obtains the basic control value $T_{AYC0}$ owing to the basic-lateral acceleration $G_Y$ being applied to the basic-control-value map 44.

Namely, it is possible to obtain the basic control value $T_{AYC0}$, in a feed-forward manner, due to sensing the steering angle $d_{sw}$ which is attributed as the degree of the driver's intent to turn the vehicle 1.

Then the acceleration/deceleration coefficient calculator 42 estimates the engine torque $T_{EG}$ based on the accelerator pedal angle $\theta_{ACC}$ and the engine revolutions $N_E$ (step S14). The calculator 42 further estimates the final reduction ratio $R_T$ of the transmission 3 based on the engine revolutions $N_E$, and an average rotation speed $v_W$ (step S15).

Still further, the acceleration/deceleration coefficient calculator 42 obtains the actual driving torque $T_{DR}$ owing to multiplication of the estimated engine torque $T_{EG}$ and final reduction ratio $R_T$ (step S16). The calculator 42 obtains acceleration/deceleration coefficient $K_{AD}$ owing to applying the actual driving torque $T_{DR}$ and the vehicle's velocity $v_B$. (step S17).

After that then the control value adjuster 43 obtains the target control value $T_{AYC}$ by multiplying the basic control value $T_{AYC0}$, which is obtained at the step S13, and the acceleration/deceleration coefficient $K_{AD}$, which is obtained at the step S17 (step S18).

Next, the control value adjuster 43 transmits the obtained the target control value $T_{AYC}$ to the rear-differential controller 31. Then the rear-differential controller 31 either promotes or prevents turning of the vehicle 1 by adjusting the driving torque between the left-rear wheel 14L and the right-rear wheel 14R according to the target control value $T_{AYC}$ (step S19).

Consequently, this embodiment of the present invention can provide the following effects and/or advantages.

It is possible to improve turning ability and operatability of the vehicle 1 because of adjusting the driving torque between the left-rear wheel 14L and the right-rear wheel 14R based on not only the steering angle $d_{sw}$, but also the acceleration/deceleration coefficient $K_{AD}$, which is related acceleration or deceleration of the vehicle 1, and the vehicle's velocity $v_B$.

It is also possible to effectively avoid excess TACK-IN by individually adjusting the driving torque of the left-rear wheel 14L and the right-rear wheel 14R according to decrements of the acceleration/deceleration coefficient $K_{AD}$ (i.e. according to increments of deceleration of the vehicle 1) so as to prevent turning the vehicle 1. This control is developed by focusing on the reason why TACK-IN happens easily because the pressure to the front wheels 8L and 8R is increased and the pressure to the rear wheels 14L and 14R is decreased.

When the vehicle 1 runs at a relatively high speed, turns and decelerates, it is difficult for the driver to control the vehicle due to the easy occurrence of excess TACK-IN. Even in such cases, according to the present invention in this embodiment, it is possible to avoid the occurrence of excess TACK-IN by increasing the degree of adjustment of the driving torque for the left-rear wheel 14L and the right-rear wheel 14R relative to the vehicle's velocity $v_B$.

Further, it is possible to effectively avoid occurrence of under-steering because of adjusting the driving torque of the left-rear wheel 14L and the right-rear wheel 14R according to increments of the acceleration/deceleration coefficient $K_{AD}$ (i.e. according to increments of the acceleration of the vehicle 1) so as to promote turning of the vehicle 1.

This control is developed by focusing on the reason why the under-steering happens easily because the pressure to the front wheels 8L and 8R is decreased and the pressure to the rear wheels 14L and 14R is increased according to increments of the acceleration of the vehicle 1.

When the vehicle 1 runs at a relatively high speed and accelerates, it is difficult for the driver to control the vehicle 1 if trying to prevent under-steering excessively because stability of the vehicle 1 is lost.

Even in such cases, according to the present invention in this embodiment, it is possible to give high priority to improving the vehicular stability to make the vehicle 1 run straight because of the decreasing degree of the adjustment of the driving torque for the left-rear wheel 14L and the right-rear wheel 14R according to increments of the vehicle's velocity $v_B$ when the vehicle 1 accelerates.

Further, it is possible to vary smoothly the driving torque of the left-rear wheel 14L and the right-rear wheel 14R relative to the acceleration or deceleration which is sensed precisely and seamlessly in quick response owing to the acceleration/deceleration value $K_{AD}$ based on the output torque $T_{EG}$ from the engine 2 being obtained As described above, the present invention is not limited to the above embodiments, but covers all changes and modifications which do not constitute departures from the spirit and scope of the invention.

In the above embodiment, the front differential 6 that is the torque-sensing type of differential that can mechanically limit the speed difference between the right and left wheels 8R and 8L corresponds to the torque input from the engine 2. However, it is acceptable to use another type of differential as the front differential 6.

Further, it is acceptable to apply the right-left wheel limiting mechanism 15 to not only the rear-differential 12 but also the front-differential 6.

Still further, in the above embodiment, the vehicle 1 is four-wheel-drive vehicle 1 is a four-wheel-drive vehicle, it is acceptable to apply the present invention to either a front-wheel drive vehicle or a rear-wheel drive vehicle.

Furthermore, in the above embodiment, the controller 31 controls the right-left wheel limiting mechanism 15 to adjust the individual driving torque output from the engine 2 to the rear wheels 14R and 14L, but the present invention is not limited to this configuration.

For example, it is acceptable to equip two motors connected to each of the right wheel and left wheel and to adjust the motor's torques, individually. In this case, it is possible to equip further such driving sources as motors and/or engines at the vehicle.

In addition, it is possible to adopt a mechanism to distribute the driving torque between the right and left wheels instead of the right-left wheel limiting mechanism 15. An example of such a mechanism may include clutch mechanisms at each of the right and left wheels to adjust the clutch pressures individually. Furthermore, it is also acceptable to equip a driving torque distribution mechanism at either of the front or rear wheels.

Still further, in the above embodiment, acceleration/deceleration coefficient calculator 42 estimates the engine torque $T_{EG}$ based on the angle $\theta_{ACC}$ of the accelerator pedal and the revolutions $N_E$ of the engine 2, but the present invention is not limited to this configuration. For example, it is possible to use volume of air-flow into the engine 1 as a substitute for the angle $\theta_{ACC}$ of the accelerator pedal.

If using the angle $\theta_{ACC}$ of the accelerator pedal for the estimation of engine torque $T_{EG}$, it is possible to realize quick estimation of the torque $T_{EG}$ because the angle $\theta_{ACC}$ reflects the driver's intent immediately. Whereas, if using the air-flow into the engine 1 for the estimation of engine torque $T_{EG}$, it is possible to estimate the torque $T_{EG}$, precisely.

Furthermore, in the above embodiment, acceleration/deceleration coefficient calculator 42 obtains the actual driving torque $T_{DR}$ by multiplying the engine torque $T_{EG}$ and the final reduction ratio $R_T$ of the transmission 3. The calculator 42 further obtains the acceleration/deceleration coefficient $K_{AD}$ by applying the actual driving torque $T_{DR}$ and the vehicle's velocity $v_B$ to the acceleration/deceleration-coefficient map 45. However the present invention is not limited to this configuration.

For example, it is possible to use such a manner that obtaining an acceleration value owing to differentiation of the vehicle's velocity $v_B$, and then converting the acceleration value to the actual driving torque $T_{DR}$. Alternatively, it is possible to use a manner that obtains the acceleration value by sensing directly with an acceleration sensor (G-sensor) and then converting the acceleration value to the actual driving torque $T_{DR}$.

As explained in the embodiment, if using the actual driving torque $T_{DR}$ for estimating precisely the state of acceleration or deceleration of the vehicle, it is possible to estimate the torque transmitting to the wheels by considering the final reduction ratio $R_T$ of the transmission 3.

If using the acceleration value obtained by converting the vehicle's velocity $v_B$, it is possible to directly estimate the state of acceleration/deceleration in a simple manner with high durability because it is not necessary to equip any special hardware.

If using the result of sensing by the G-sensor, it is possible to directly estimate with accuracy.

What is clamed is:

1. A turning control apparatus for a vehicle, comprising:
    a driving torque controller for adjusting driving torque between a left wheel and a right wheel;
    means for detecting a state of turning of the vehicle;
    means for sensing a velocity of the vehicle;
    means for setting a basic-driving-torque-difference value indicating a difference of the driving torque between the left wheel and the right wheel;
    means for obtaining an acceleration/deceleration value indicating a degree of acceleration or deceleration of the vehicle; and
    means for adjusting the basic-driving-torque-difference value, as a target driving torque difference, according to the acceleration/deceleration value, obtained by said acceleration/deceleration value obtaining means, and the velocity of the vehicle received from said vehicle velocity sensing means,
    said driving torque controller adjusting the driving torque between the left wheel and the right wheel according to the target driving torque obtained by said basic-driving-torque-difference value adjusting means.

2. A turning control apparatus for the vehicle according to claim 1, wherein
    said basic-driving-torque-difference value adjusting means increases the degree of adjustment of the basic-driving-torque-difference value more when the vehicle is accelerated than when the vehicle is decelerated.

3. A turning control apparatus for the vehicle according to claim 1, wherein
    said basic-driving-torque-difference value adjusting means adjusts the basic-driving-torque-difference value so as to promote turning of the vehicle according to increments of acceleration indicated by the acceleration/deceleration value, and
    said basic-driving-torque-difference value adjusting means adjusts the basic-driving-torque-difference value so as to prevent turning of the vehicle according to increments of deceleration indicated by the acceleration/deceleration value.

4. A turning control apparatus for the vehicle according to claim 3, wherein
    when the vehicle is decelerated,
    said basic-driving-torque-difference value adjusting means increases the degree of the adjustment of the basic-driving-torque-difference value according to increments of the velocity sensed by said vehicle velocity sensing means.

5. A turning control apparatus for the vehicle according to claim 3, wherein
    when the vehicle is accelerated,
    said basic-driving-torque-difference value adjusting means decreases the degree of adjustment of the basic-driving-torque-difference value according to increments of the velocity sensed by said vehicle velocity sensing means.

6. A turning control apparatus for the vehicle according to claim 1, wherein
    the vehicle is equipped with an engine,
    said acceleration/deceleration value obtaining means obtains the acceleration/deceleration value based on an output torque of the engine.

7. A turning control apparatus for the vehicle according to claim 1, wherein
    said basic-driving-torque-difference value adjusting means adjusts the basic-driving-torque-difference value so as to promote turning of the vehicle according to increments of acceleration indicated by the acceleration/deceleration value.

8. A turning control apparatus for the vehicle according to claim 1, wherein
    said basic-driving-torque-difference value adjusting means adjusts the basic-driving-torque-difference value so as to prevent turning of the vehicle according to increments of deceleration indicated by the acceleration/deceleration value.

* * * * *